CONTROL CIRCUIT FOR SOLID STATE RECTIFIER

Filed March 31, 1964 2 Sheets-Sheet 1

INVENTORS
GUNTER J. GESSNER
ONOFRIO A. LA GRECA
BY Arthur T. Groeninger
ATTORNEY

CONTROL CIRCUIT FOR SOLID STATE RECTIFIER

Filed March 31, 1964 2 Sheets-Sheet 2

INVENTORS
GUNTER J. GESSNER
ONOFRIO A. LA GRECA
BY [signature]
ATTORNEY

United States Patent Office 3,324,355

Patented June 6, 1967

3,324,355
CONTROL CIRCUIT FOR SOLID STATE RECTIFIER

Gunter J. Gessner, Maywood, and Onofrio A. La Greca, Glen Rock, N.J., assignors to The Bendix Corporation, Teterboro, N.J., a corporation of Delaware Filed Mar. 31, 1964, Ser. No. 356,168
6 Claims. (Cl. 317—148.5)

This invention relates to a firing circuit for a solid state switch and more particularly, to a firing circuit capable of maintaining a silicon controlled rectifier switch conducting when the magnitude of the firing pulse applied to the gate electrode of the silicon controlled rectifier switch varies about the firing level.

The present invention includes a silicon controlled rectifier switch used to rectify and control the flow of current from an alternating current excitation source to a relay coil. The silicon controlled rectifier is initially fired by a gate signal applied to its gate electrode which varies at a ramp rate. When the gate signal reaches the firing lever, the silicon controlled rectifier turns on and acts like an ordinary p-n diode thereby transmitting a pulsating current to the relay coil.

The standard silicon controlled rectifier switch has no inherent hysteresis and as a result, it will turn on and off when the magnitude of the gate signal varies about the firing level. This results in relay chatter.

In order to obviate the problem of relay chatter, an RC circuit, comprising a series combination of a resistor and capacitor, is connected across the gate signal source. While the silicon controlled rectifier switch is conducting, the capacitor is charged. When the gate signal deviates by a small amount below the firing level, the capacitor will discharge and add to the gate signal to bring the gate voltage up to firing level.

The charging rates as well as the amount of charge stored in the capacitor is capable of being varied thereby providing a variable hysteresis characteristic for the silicon controlled rectifier.

The silicon controlled rectifier operates reliably over a wide temperature range. Zener diodes control the voltage required to turn on the silicon controlled rectifier and function to temperature stabilize the firing level. Resistors connected across the gate signal source provide good current stability.

An object of the present invention is to provide a firing circuit for a solid state switch.

Another object of the present invention is to provide a firing circuit capable of maintaining a solid state rectifier switch in a conducting state when the magnitude of the firing signal for the switch varies about the firing level.

Another object of the present invention is to provide a firing circuit as described in the preceding paragraph, including means for adjusting the range below the firing level within which the firing signal may vary before the silicon controlled rectifier will turn off.

Another object of the present invention is to provide a firing circuit for a silicon controlled rectifier switch capable of operating over a wide temperature range.

Figure 1:
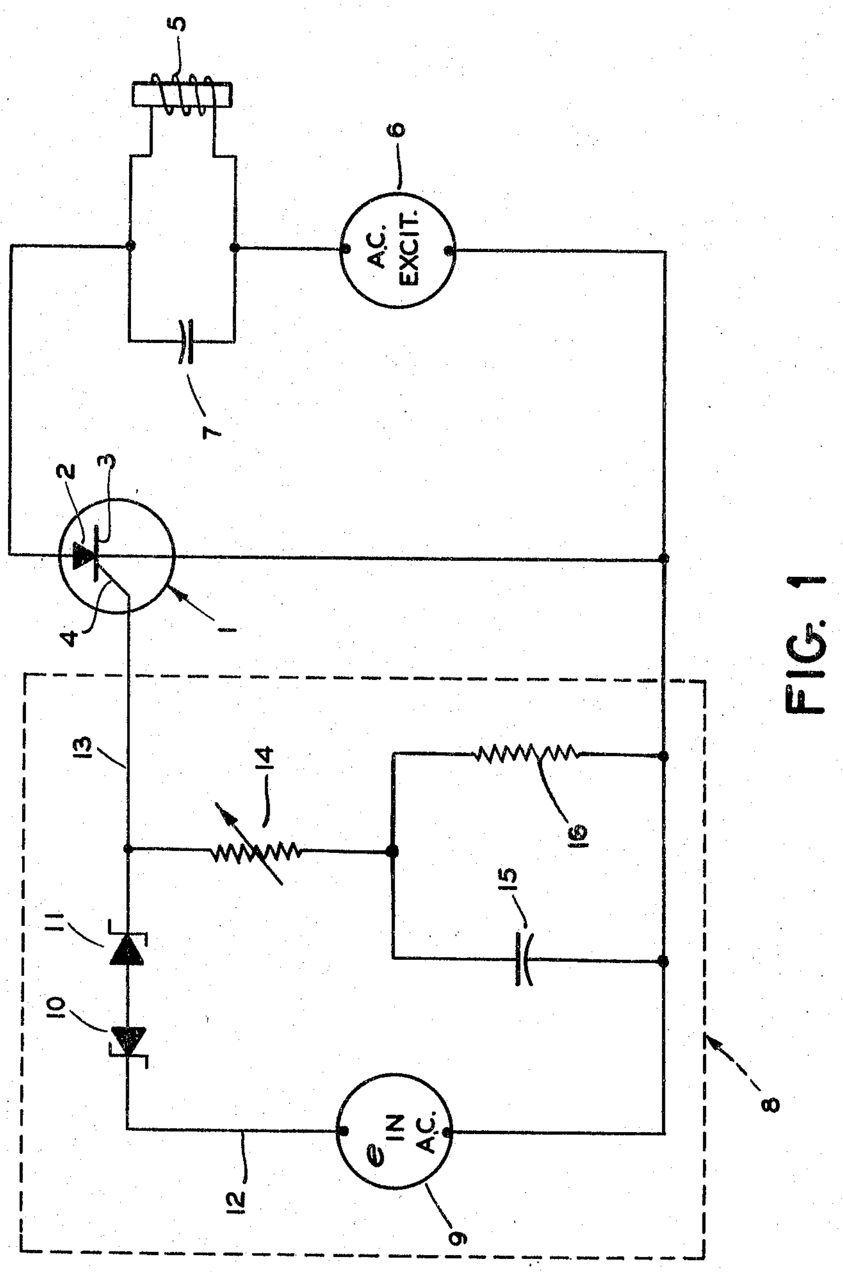
FIGURE 1 is a schematic diagram of the present invention.

Referring to FIGURE 1, a silicon controlled rectifier 1 is shown. The silicon controlled rectifier 1 comprises a p-n-p-n semiconductor having an anode 2, a cathode 3, and a gate electrode 4. When a gate signal of sufficient magnitude is introduced into gate electrode 4, the silicon controlled rectifier 1 will conduct like an ordinary p-n diode.

The silicon controlled rectifier 1 is connected in series with a relay coil 5 and an excitation source 6. When a firing signal of sufficient magnitude is applied to the gate electrode 4, the silicon controlled rectifier 1 is rendered conductive and a pulsating current is fed to relay coil 5 to energize the relay. A capacitor 7 is connected across the relay coil 5 to smooth the otherwise pulsating current in the relay coil 5.

A control circuit 8 is provided for applying a firing signal to the silicon controlled rectifier 1. The silicon controlled rectifier 1 is rendered conductive when the firing signal rises to a predetermined level.

The control circuit 8 includes an alternating current input signal source 9, which provides an input signal $e_{in}$ varying at a ramp rate. The waveform of two cycles of the A.C. input signal $e_{in}$, referenced to time $t_o$, is shown in FIGURE 2.

There is further provided a pair of zener diodes 10 and 11, which have opposite anode terminal regions connected together. The zener diodes 10 and 11 are connected by conductors 12 and 13 between the input signal source 9 and the gate electrode 4 of the silicon controlled rectifier 1. When the input signal $e_{in}$ is of sufficient magnitude to pass diodes 10 and 11, a gate signal $e_g$ is fed to the gate electrode 4 by conductor 13.

Figure 2:
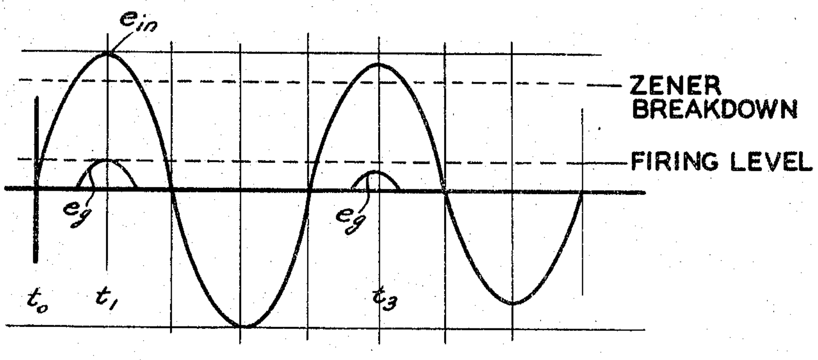
FIGURES 2–5 are graphs of characteristic curves which serve to facilitate an understanding of the invention.
Figure 3:
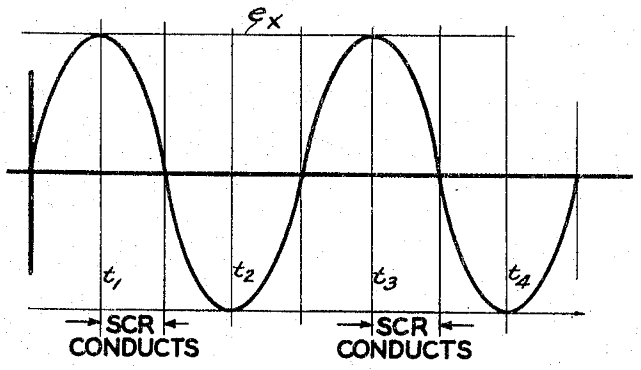

The waveform of the gate signal $e_g$, referenced to a time $t_o$, is also illustrated in FIGURE 2. The waveform of the excitation signal $e_x$, derived from excitation source 6, is shown in FIGURE 3. The magnitude of the excitation signal $e_x$ is shown greatly reduced relative to the magnitude of the signals illustrated in FIGURES 2, 4, and 5. The gate signal $e_g$ has the same frequency as the excitation signal $e_x$ and is either in phase or 180° out of phase with the excitation signal $e_x$, as shown in FIGURES 2 and 3. As the gate signal $e_g$ is passing through its maximum value, the excitation signal $e_x$ is going through a positive alternation which, when transmitted to silicon controlled rectifier 1, makes anode 2 positive relative to cathode 3. As a result, when the gate signal reaches the firing level, the silicon controlled rectifier 1 is turned on and a pulsating current is fed to the relay coil 5.

The diodes 10 and 11 are used to control the input voltage required to render the silicon controlled rectifier 1 conductive. The firing level of the silicon controlled rectifier 1 may vary with temperature. Without the zener diodes 10 and 11, the firing level may vary over a substantial portion of the input signal range. Due to the voltage required to break down the zener diodes 10 and 11, the firing level will vary over a small percentage of the input signal range. In this manner, variations in the firing level of the silicon controlled rectifier 1 resulting from temperature change are minimized.

An RC circuit, comprising a series combination of a resistor 14 and a capacitor 15, is connected across the input signal source 9. When the silicon controlled rectifier 1 is conducting, a feedback pulse is fed through the gate electrode 4 of the silicon controlled rectifier 1 and charges the capacitor 15. The capacitor 15 discharges during the negative alternation of the excitation signal $e_x$ when the silicon controlled rectifier 1 is not conducting. The charge $e_c$ remaining on capacitor 15 at the beginning of the next conducting period for the silicon controlled rectifier 1 is added to the gate signal $e_g$.

Each time the silicon controlled rectifier 1 is rendered conductive, the feedback pulse is again transmitted to the capacitor 15 and restores the charge that was used during the discharge time of the capacitor 15. This cycling will go on until the combined gate and capacitor voltages, $e_g$ plus $e_c$, fall below the firing level.

Resistor 14 is adjustable and it cooperates with resistor 16 to form a voltage divider network across the input signal source 9. By varying resistance 14, the charging rates as well as the amount of charge stored in capacitor 15 can be varied. Resistor 14 together with resistor 16 also cooperates to form a current stabilization circuit to minimize the effect of temperature change.

Figure 4:
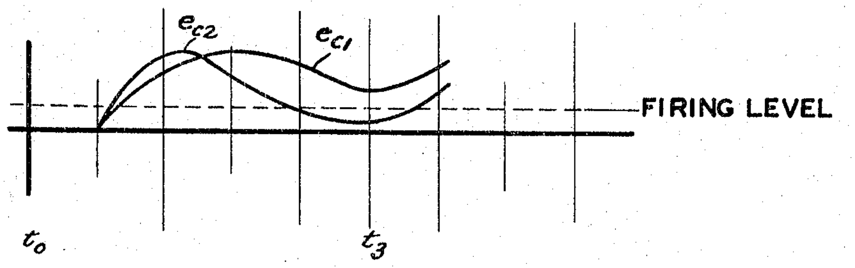

The amount of charge $e_c$ stored by capacitor 15 can be varied by adjusting resistor 14. The rise and fall times of the charge $e_c$ on capacitor 15 is illustrated in FIGURE 4. Curves $e_{c1}$ and $e_{c2}$ illustrate possible rise and fall times of capacitor charge $e_c$ resulting from adjustment of resistor 14.

The resistor 14 may be adjusted to provide a long time constant for the RC circuit. The rise and fall time of the charge on capacitor 15 in this case is illustrated at $e_{c1}$. It will be noted that at time $t_3$, the charge $e_{c1}$ provides a firing pulse of sufficient magnitude to turn on the silicon controlled rectifier. As a result, the silicon controlled rectifier cannot be turned off until the excitation source 6 is removed.

Figure 5:
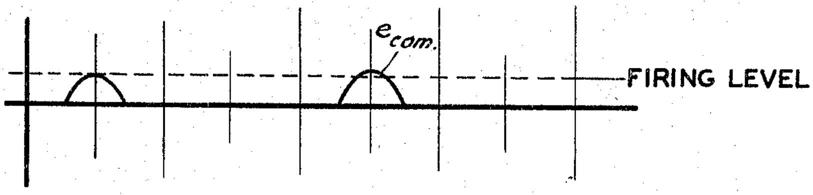

The resistor 14 may be adjusted to a time constant somewhat smaller than that described in the last paragraph as illustrated by curve $e_{c2}$. It will be noted that at time $t_3$, the charge $e_{c2}$ fed to the gate electrode 4 is not sufficient to fire the silicon controlled rectifier. However, when this is combined with the gate electrode signal $e_g$, illustrated in FIGURE 2, the combined voltages $e_{com}$, illustrated in FIGURE 5, provide a gate voltage at firing level.

The resistor 14 may also be adjusted to a value to provide a very short time constant. When resistor 14 is so adjusted, capacitor 15 stores a negligible amount of feedback signal. Under these conditions, the firing of the silicon controlled rectifier 1 depends completely on the magnitude of the gate signal $e_g$.

*Operation*

The input signal source 8 provides an input signal $e_{in}$ varying at a ramp rate, as shown in FIGURE 2. When the magnitude of the input signal is of sufficient magnitude to pass zener diodes 10 and 11, a gate signal $e_g$ is fed to the gate electrode 4 of the silicon controlled rectifier switch 1. The gate signal $e_g$ is of such a phase that as it reaches its maximum positive value, the excitation signal $e_x$ from excitation source 6 is at its maximum value making the anode 2 positive relative to the cathode 3. As a result, when the gate signal $e_g$ reaches the firing level, the silicon controlled rectifier 1 turns on and acts like an ordinary p-n diode transmitting a pulsating current to relay coil 5 to energize the relay. Capacitor 7, connected across the relay coil 5, functions to smooth the otherwise pulsating current flowing through the relay coil 5.

When the silicon controlled rectifier switch 1 is conducting, a feedback pulse is transmitted to the capacitor 15. The capacitor 15 discharges during the negative alternation of the excitation signal when the silicon controlled rectifier 1 is not conducting. The charge remaining on the capacitor 15, at the beginning of the next conducting period for the rectifier 1, is added to the gate signal $e_g$. When the gate signal deviates by a small amount below the firing level, the charge remaining on the capacitor 15 will add to gate signal and bring the gate voltage up to the firing level.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. Apparatus comprising an alternating current input signal source, a pair of zener diodes having opposite terminal regions connected together, a silicon controlled rectifier switch having a gate electrode, an input circuit connecting said zener diodes in series with said input signal source and said gate electrode to determine the level of firing voltage, said input circuit including a resistor and capacitor connected across said input signal source and a resistor connected in parallel with said capacitor, said capacitor preventing said rectifier switch from cutting off in response to said input signal varying in magnitude within a predetermined range below a predetermined level, an alternating current excitation source, a relay coil, means for connecting said silicon controlled rectifier switch in series with said relay coil and said excitation source, and a capacitor connected across said relay coil.

2. Apparatus comprising a solid state rectifier switch, means for providing a firing signal, means connecting said rectifier switch to said signal means for rendering said rectifier switch conductive in response to said firing signal reaching a predetermined level, and means connected to said rectifier switch and including a capacitor for preventing said rectifier switch from cutting off in response to said firing signal varying in magnitude within a predetermined range below said predetermined level.

3. Apparatus as defined by claim 2 in which said last mentioned means includes means for adjusting the range below said predetermined level within which said firing signal may vary before the solid state rectifier switch will turn off.

4. Apparatus as defined by claim 2 in which said last mentioned means includes means for minimizing the effect of changes in the firing level of said solid state switch in response to changes in temperature.

5. Apparatus comprising an input signal source for providing an input signal, a solid state switch having a control electrode, means for connecting said input signal source to said control electrode and including means for periodically rendering said solid state switch conductive in response to an input signal of predetermined magnitude being applied to said control electrode, means for storing a charge during the period said solid state switch is rendered conductive, and means for applying said stored charge to said gate electrode when the input signal drops a small amount below the predetermined magnitude.

6. Apparatus comprising an alternating current input source, a silicon controlled rectifier having a gate electrode, zener diode means connecting said input signal source to said gate electrode and determining the level of firing voltage, a resistor and capacitor combination connected across said input signal source and to said gate electrode, an alternating current excitation source, load means, and means for connecting said alternating current excitation source in series with said silicon controlled rectifier and load means, said capacitor storing a charge when said silicon controlled rectifier conducts and energizes said load means and applying the stored charge to said gate electrode when said silicon controlled rectifier would not ordinarily conduct.

References Cited

UNITED STATES PATENTS

| | | | |
|---|---|---|---|
| 3,091,704 | 5/1963 | Bashor | 307—88.5 |
| 3,222,548 | 12/1965 | Sanford | 307—88.5 |
| 3,243,597 | 3/1966 | Burley | 307—39 |

MILTON O. HIRSHFIELD, *Primary Examiner.*

J. A. SILVERMAN, *Assistant Examiner.*